United States Patent
Otsuka

(10) Patent No.: US 11,768,628 B2
(45) Date of Patent: Sep. 26, 2023

(54) INFORMATION PROCESSING APPARATUS

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/627,895

(22) PCT Filed: Feb. 4, 2020

(86) PCT No.: PCT/JP2020/004179
§ 371 (c)(1),
(2) Date: Jan. 18, 2022

(87) PCT Pub. No.: WO2021/079535
PCT Pub. Date: Apr. 29, 2021

(65) Prior Publication Data
US 2022/0276804 A1 Sep. 1, 2022

(30) Foreign Application Priority Data
Oct. 23, 2019 (JP) .................. 2019-193023

(51) Int. Cl.
*G06F 12/00* (2006.01)
*G06F 3/06* (2006.01)
*G06F 12/1009* (2016.01)

(52) U.S. Cl.
CPC .......... *G06F 3/0658* (2013.01); *G06F 3/0611* (2013.01); *G06F 3/0683* (2013.01); *G06F 12/1009* (2013.01)

(58) Field of Classification Search
CPC .. G06F 3/0658; G06F 3/0683; G06F 12/1009; G06F 2212/1024
See application file for complete search history.

(56) References Cited

U.S. PATENT DOCUMENTS

| 8,335,893 | B2 | 12/2012 | Tagawa |
| 8,589,625 | B2 | 11/2013 | Colgrove |
| 8,768,883 | B2 | 7/2014 | Mori |
| 9,747,040 | B1* | 8/2017 | Balakrishnan ...... G06F 12/0868 |
| 10,732,898 | B2* | 8/2020 | Shi ........................ G06F 3/0604 |

(Continued)

FOREIGN PATENT DOCUMENTS

| JP | 2008242503 A | 10/2008 |
| JP | 2013541765 A | 11/2013 |

(Continued)

OTHER PUBLICATIONS

English language translation of Written Opinion dated Jan. 18, 2022 (Year: 2022).*

(Continued)

*Primary Examiner* — John A Lane
(74) *Attorney, Agent, or Firm* — Matthew B. Dernier, Esq.

(57) ABSTRACT

An information processing apparatus receives an access request to a plurality of storage devices and executes access to one of the plurality of storage devices in response to the received access request. The information processing apparatus changes a mode of the access according to a performance required for readout of target data that is a target of the access request.

26 Claims, 11 Drawing Sheets

(56) References Cited

U.S. PATENT DOCUMENTS

| | | | |
|---|---|---|---|
| 11,314,444 B1* | 4/2022 | Brooker | ................ G06F 16/119 |
| 2003/0204702 A1 | 10/2003 | Lomax, Jr. et al. | |
| 2008/0235467 A1 | 9/2008 | Tagawa | |
| 2012/0018542 A1 | 1/2012 | Mori | |
| 2012/0066449 A1 | 3/2012 | Colgrove | |
| 2015/0134857 A1 | 5/2015 | Hahn | |
| 2016/0179403 A1 | 6/2016 | Kurotsuchi et al. | |
| 2018/0203637 A1 | 7/2018 | Furuya | |
| 2019/0294355 A1* | 9/2019 | Shirota | ................ G06F 3/0634 |

FOREIGN PATENT DOCUMENTS

| | | | |
|---|---|---|---|
| JP | 2015176378 A | 10/2015 |
| JP | 2018116329 A | 7/2018 |
| JP | 2019049787 A | 3/2019 |
| WO | 2008026497 A1 | 3/2008 |
| WO | 2011117925 A1 | 9/2011 |
| WO | 2015008356 A1 | 1/2015 |

OTHER PUBLICATIONS

English language translation of JP 2015176378A (Year: 2015).*
International Search Report for corresponding PCT Application No. PCT/JP2020/004179, 6 pages, dated Apr. 28, 2020.
Decision of Refusal for corresponding JP Application No. 2021-554050, 13 pages, dated Jun. 12, 2023.

* cited by examiner

FIG.5
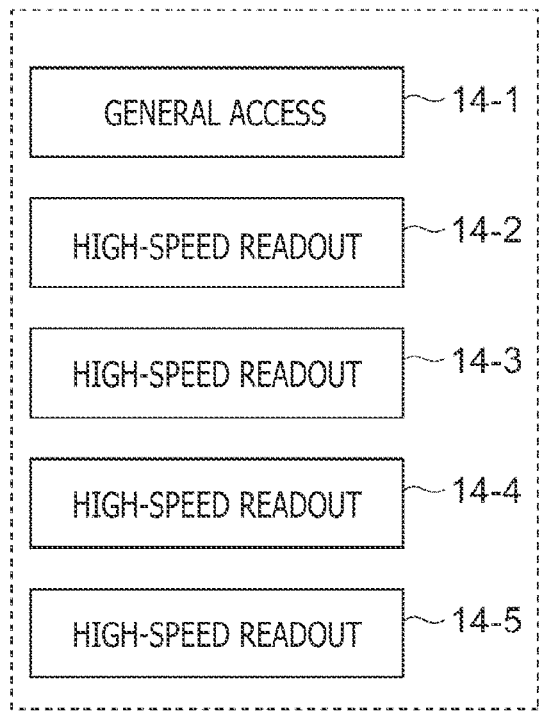
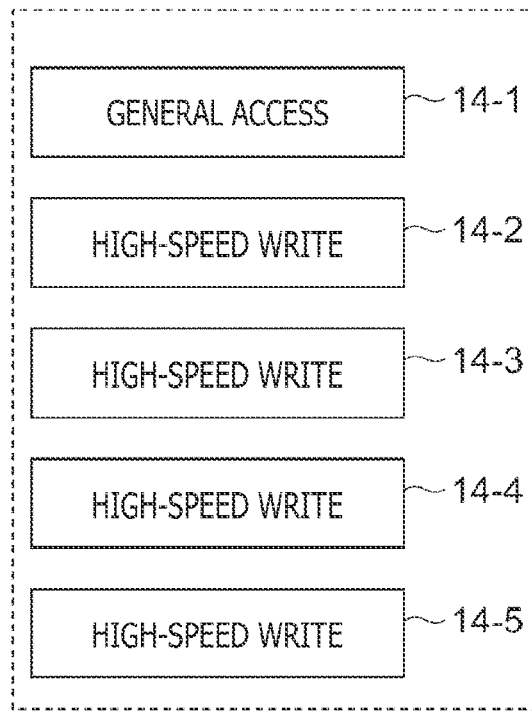
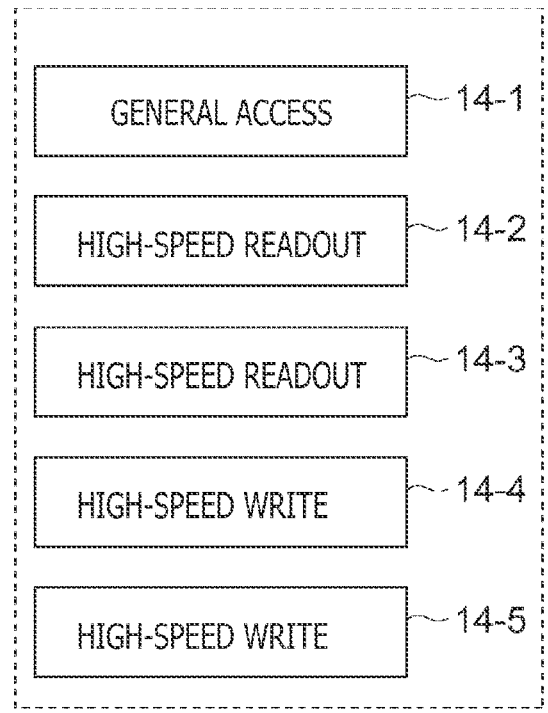

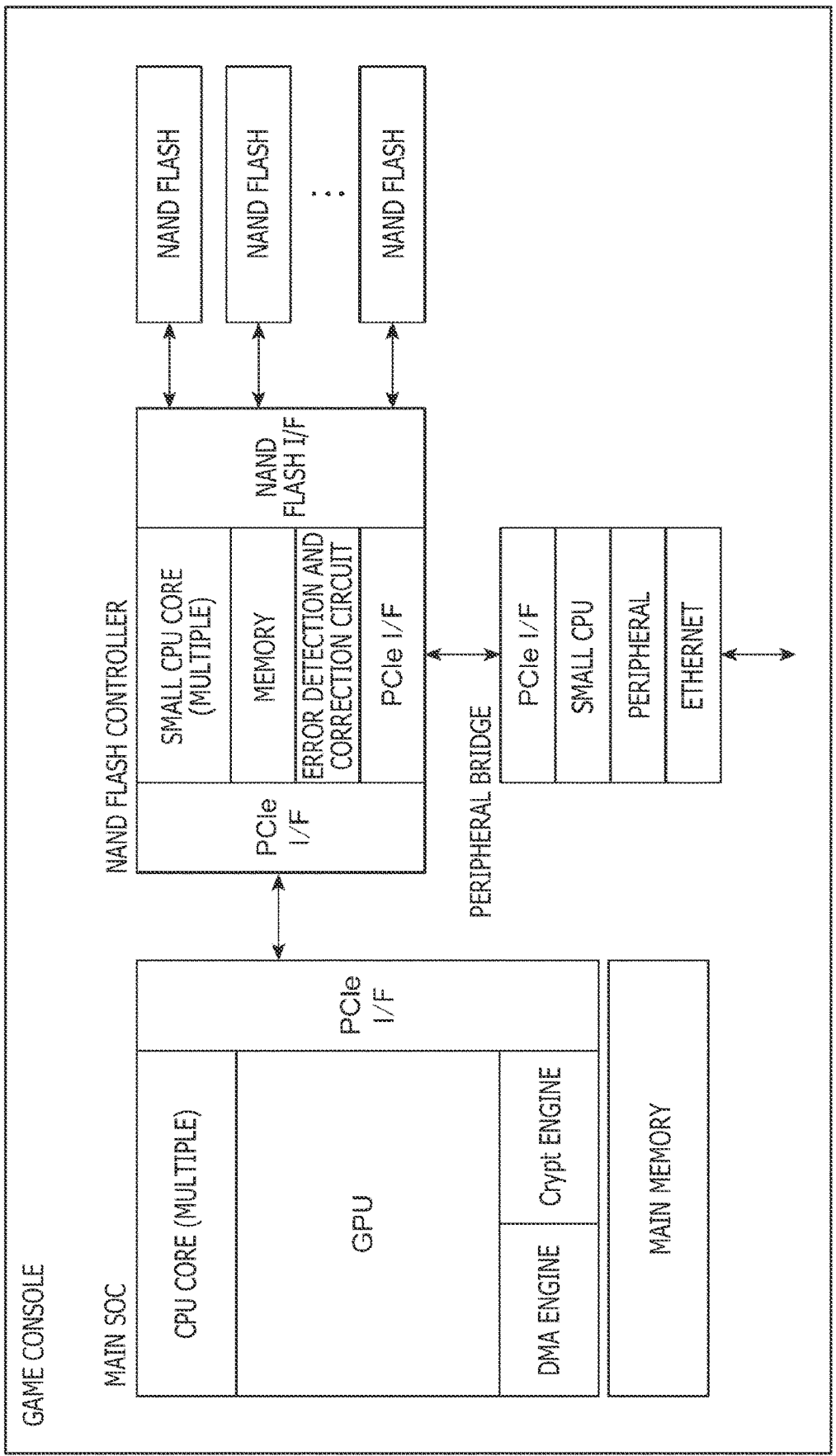
F I G. 8

F I G. 1 2
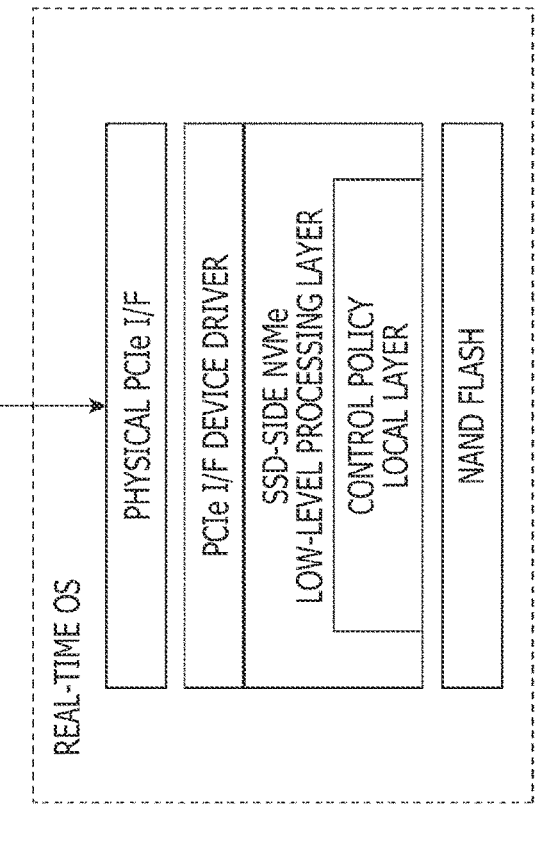
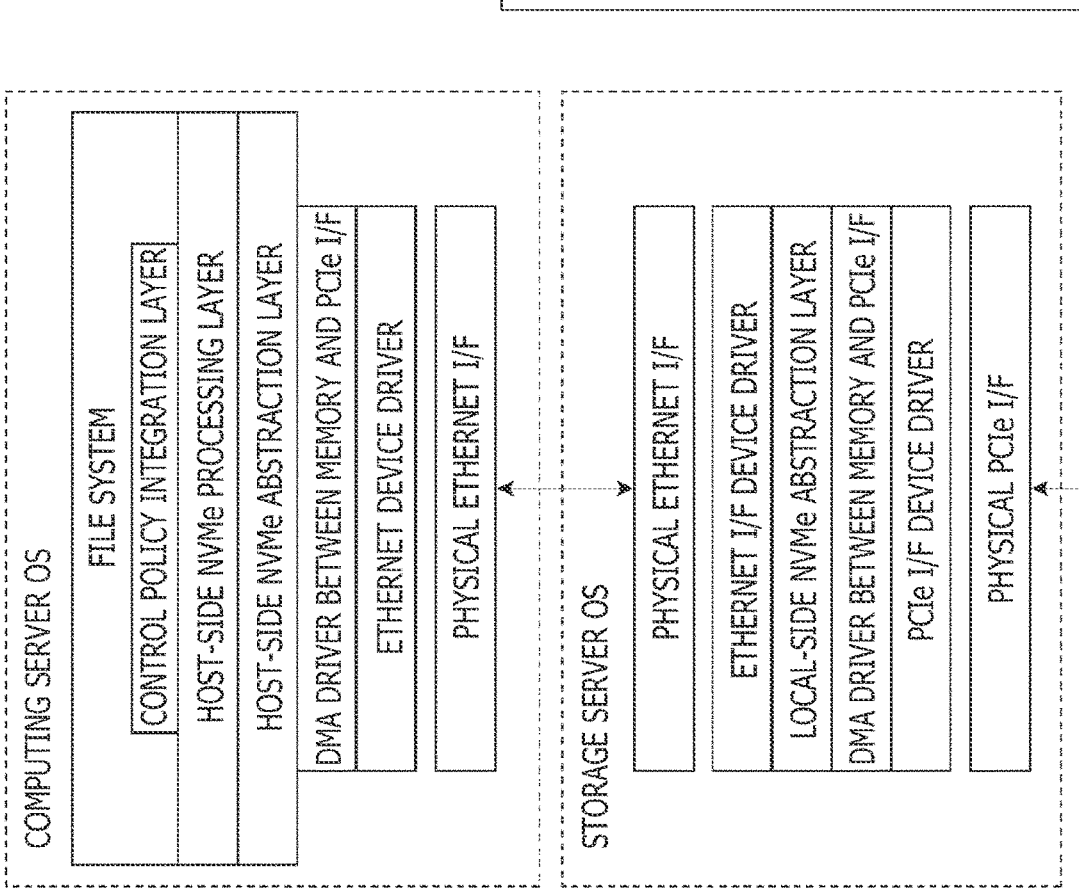

INFORMATION PROCESSING APPARATUS

TECHNICAL FIELD

The present invention relates to an information processing apparatus, an information processing method, and a program for reading out data from storage devices.

BACKGROUND ART

An information processing apparatus, such as a home game machine, a personal computer, or a smartphone, generally includes a plurality of storage devices for storing information, such as flash memories, and operates while storing data in these storage devices and reading out the stored data therefrom.

SUMMARY

Technical Problems

In some cases, a conflict between multiple access requests to the same storage device causes a delay (latency) in readout access when the data is read out from the storage device. For example, there is a case where it is expected to read out the data with a latency that satisfies a predetermined requirement level, such as a case where streaming data such as a video or game data used to update rendering in real time is read out. In such a case, if such an access delay occurs, it is not possible to ensure the required level, which is not desirable.

In particular, it is known that a storage device such as a Not AND (NAND) flash memory has a limit to the number of times a memory cell can be rewritten (memory cell lifetime), and it is necessary to take into account the distribution and leveling of memory cells to be used, that is, wear leveling. Further, there is a restriction that readout and write can only be executed in units of pages (e.g., in units of 16 kilobytes) and deletion can only be executed in units of blocks (e.g., in units of 1.2 megabytes), which are larger in size than pages. In such a situation, if the write is repeatedly executed during the operation of the storage device, unused regions are generated in each block in a fragmented manner, and the utilization efficiency and access performance of the storage device deteriorate. Further, the uneven frequency of use of each memory cell causes the rewritable lifetime of each memory cell to become uneven. As a countermeasure to these problems, it is necessary to execute, at any necessary timing, management access, that is, processing called defragmentation or garbage collection, which reads out written data, collectively writes the data into a different region, consecutively secures the deletable original regions in units of blocks, and then performs the deletion. Such management access is indispensable for the use of the NAND flash memory. However, a conflict between this management access and normal data access varies the latency of the normal data access, which, in some cases, makes it difficult to predict the time required for the access.

The present invention has been made in view of such circumstances. One of objects of the present invention is to provide an information processing apparatus, an information processing method, and a program that can eliminate the effect of other conflict access such as management access and ensure the necessary required performance when data is read out from storage devices.

Solution to Problems

An information processing apparatus according to one aspect of the present invention is an information processing apparatus for controlling access to a plurality of storage devices and includes a reception section configured to receive an access request to the plurality of storage devices, and an access control section configured to execute access to one of the plurality of storage devices in response to the received access request, in which the access control section changes a mode of the access according to performance required for readout of target data that is a target of the access request.

An information processing method according to one aspect of the present invention is an information processing method for controlling access to a plurality of storage devices and includes a step of receiving an access request to the plurality of storage devices, and an access control step of executing access to one of the plurality of storage devices in response to the received access request, in which the access control step changes a mode of the access according to a performance required for readout of target data that is a target of the access request.

A program according to one aspect of the present invention is a program for causing a computer for controlling access to a plurality of storage devices to execute a step of receiving an access request to the plurality of storage devices, and an access control step of executing access to one of the plurality of storage devices in response to the received access request, in which the access control step changes a mode of the access according to a performance required for readout of target data that is a target of the access request. This program may be stored and provided in a computer-readable, non-transitory information storage medium.

BRIEF DESCRIPTION OF DRAWINGS

FIG. 5 is a diagram for describing an example of use allocation to storage devices executed by the device control circuit.

FIG. 8 is a diagram illustrating an example of a configuration for the case where an embodiment of the present invention is applied to a game console.

FIG. 12 is a diagram illustrating a software hierarchy configuration of the server system.

DESCRIPTION OF EMBODIMENT

Hereinafter, an embodiment of the present invention will be described with reference to the drawings.

Figure 1:
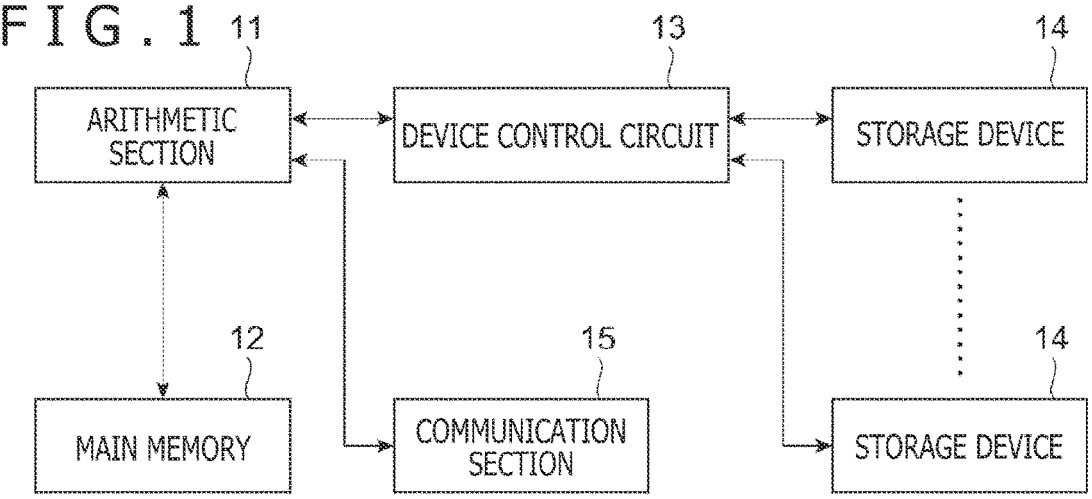
FIG. 1 is a block diagram representing an example of a configuration of an information processing apparatus according to an embodiment of the present invention.

An information processing apparatus 1 according to an embodiment of the present invention is a home game machine, a server computer, or the like, and includes an arithmetic section 11, a main memory 12, a device control circuit 13, a plurality of storage devices 14, and a communication section 15, as illustrated in FIG. 1.

The arithmetic section 11 includes a program control device such as a central processing unit (CPU) and executes various information processes according to programs such as an operating system and application programs stored in the main memory 12. The main memory 12 includes a volatile storage element such as a random access memory (RAM) and temporarily retains various programs executed by the arithmetic section 11 and data used by those programs.

The device control circuit 13 is an integrated circuit or the like and executes processing for controlling the operation of the storage devices 14 according to a firmware program retained therein. In particular, the device control circuit 13 receives an access request such as a request for reading out data, a request for writing data, or a request for deleting data from the arithmetic section 11 and executes access to the storage devices 14 that corresponds to the contents of the request, as described later. Further, the device control circuit 13 also executes various control processes, such as garbage collection and wear leveling, that are required for the management of the storage devices 14.

Each of the plurality of storage devices 14 is a device including a non-volatile storage element and stores programs and various pieces of data used by the information processing apparatus 1. Each storage device 14 may be, for example, a NAND flash memory or the like. The data stored in each storage device 14 is, for example, stored in the main memory 12 in response to a request from the arithmetic section 11 when used.

In the present embodiment, each of the plurality of storage devices 14 can be independently accessed. In other words, when there are multiple access requests to a single storage device 14, those accesses cannot be executed simultaneously and conflict with each other. In contrast, accesses to different storage devices 14 do not conflict with each other and can be executed in parallel.

The communication section 15 is an interface for transmitting and receiving data to and from an external communication network in a wireless or wired manner. The information processing apparatus 1 transmits and receives data to and from other communication devices via the communication section 15.

Figure 2:
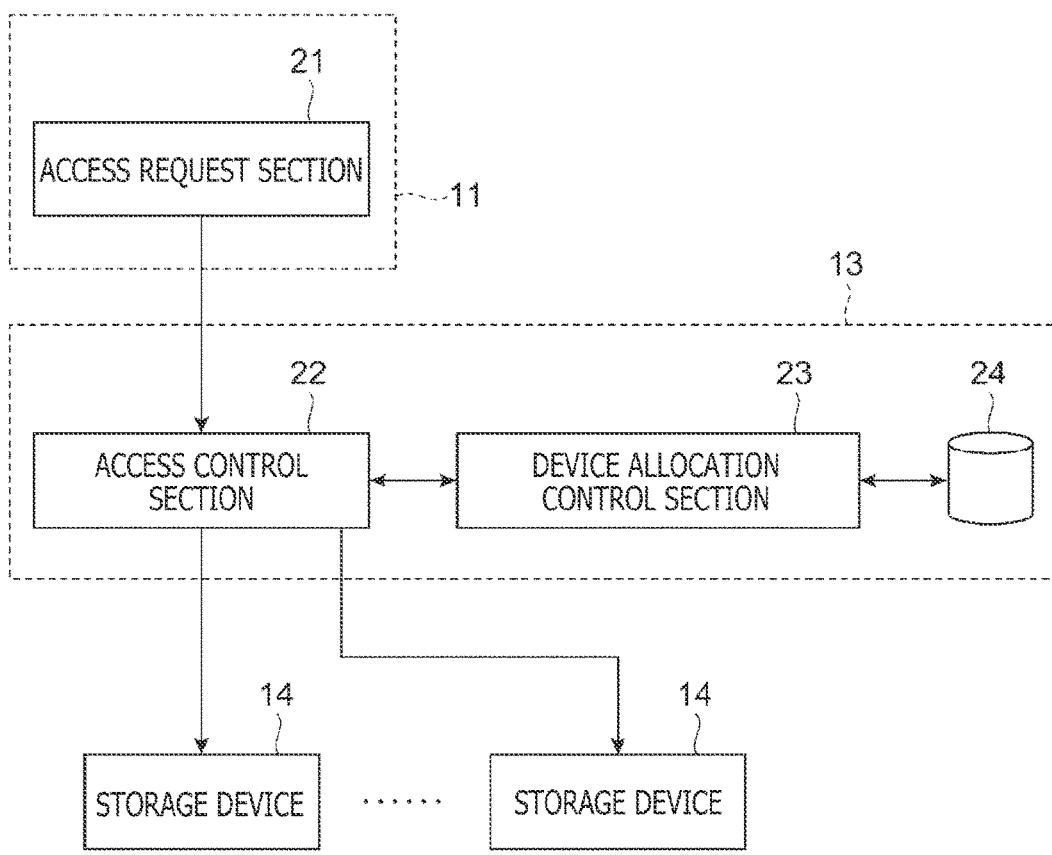
FIG. 2 is a functional block diagram representing functions of the information processing apparatus according to the embodiment of the present invention.

Hereinafter, the functions implemented by the information processing apparatus 1 according to the present embodiment will be described with reference to FIG. 2. As illustrated in FIG. 2, the information processing apparatus 1 functionally includes an access request section 21, an access control section 22, a device allocation control section 23, and an information storage section 24. The access request section 21 is implemented by the arithmetic section 11 executing programs such as the operating system stored in the main memory 12. The access control section 22, the device allocation control section 23, and the information storage section 24 are implemented by the device control circuit 13 executing the built-in firmware program.

The access request section 21 issues a data access request to the device control circuit 13 in response to a request from an application program at a higher level or the like. The access request issued by the access request section 21 may include a request for writing data to the storage devices 14, a request for reading out data stored in the storage devices 14, and a request for deleting data stored in the storage devices 14. Moreover, in the present embodiment, when issuing at least some of the access requests, the access request section 21 notifies the device control circuit 13 of, together with the access request, information regarding a performance required when the data that is the target of the access request is read out. Hereinafter, the information regarding the required readout performance will be referred to as required performance information.

Specifically, the required performance information may include, for example, information specifying the size of the required bandwidth (the amount of data to be read out per unit time) and information specifying the allowable delay (latency) when the data is read out. Alternatively, the required performance information may simply be information specifying each of whether or not data is required to be read out with a wide bandwidth (that is, at a predetermined data readout speed or higher) and whether or not data is required to be read out with a short delay (that is, a latency of a predetermined value or less). Further, the required performance information may include information specifying that a best-effort readout is allowed. In this case, the required performance for a delay or a bandwidth is not specified.

For each access request, the access request section 21 may add the required performance information for the data that is the target of the access request to the access request and give notification. Alternatively, for each of a series of data that are the targets of the access request, the access request section 21 may add the required performance information for the data. Specifically, the access request may be a burst access request, a block access request, a chain list access request, or the like, and in some cases, multiple data accesses are executed in a division manner in response to a single access request. In such a case, the access request section 21 may specify the required performance information for each data access to be executed in a division manner. Further, there is a case where multiple data accesses are executed in a division manner in response to an access request to a single file such as an access request that cooperates with a file system. In such a case, the access request section 21 may also specify the required performance information for each of the multiple data accesses.

The access request section 21 may determine the contents of the required performance information according to a specification by an application program that is an access request source. Alternatively, the contents of the required performance information may be automatically determined according to the type of application program that is an access request source. As an example, in a game program or the like, there is a case where data necessary for rendering a game screen needs to be read out in real time during game processing. In this case, the access request section 21 specifies the required performance information specifying that readout with the short delay is required.

It is noted that when issuing a request for writing data, the access request section 21 may give notification of the required performance information that specifies the performance required when the data is read out at a later time. Further, when issuing a request for reading out data, the access request section 21 may give notification of the required performance information that specifies the performance required for the readout of the data that is the target of the readout request.

The access control section 22 receives an access request issued by the access request section 21 and executes access control to the storage devices 14 that corresponds to the contents of the request. In particular, in the present embodiment, in the case where the access control section 22 receives a request for reading out data accompanied by the required performance information, the access control section 22 executes control required to achieve readout with the required performance. Further, in the case where the access control section 22 receives a request for writing data accompanied by the required performance information, the access control section 22 changes the storage devices 14 to which the data is to be written according to the contents of the required performance information.

The following describes some specific examples of the contents of the control executed by the access control section 22 in the case where the access control section 22 receives an access request accompanied by the required performance information.

First, the following describes the control executed by the access control section 22 in the case where the access control section 22 receives a request for reading out data accompanied by the required performance information that specifies readout with the short delay. As a specific example here, assume that the access control section 22 receives a readout request R1. The readout request R1 requires data D1, which is stored in a storage device 14-1 among the plurality of storage devices 14, to be read out with the short delay. In this case, when the access control section 22 receives another access request R2 while reading out the data D1, the access control section 22 executes control such that the access corresponding to the access request R2 does not interfere with the readout of the data D1. For this purpose, when executing processing corresponding to the access request R2, the access control section 22 does not allow access to the storage device 14-1 storing the data D1. In this way, it is possible to avoid a conflict in access to the storage device 14-1 and prevent a delay in the access for reading out the data D1.

Figure 3:
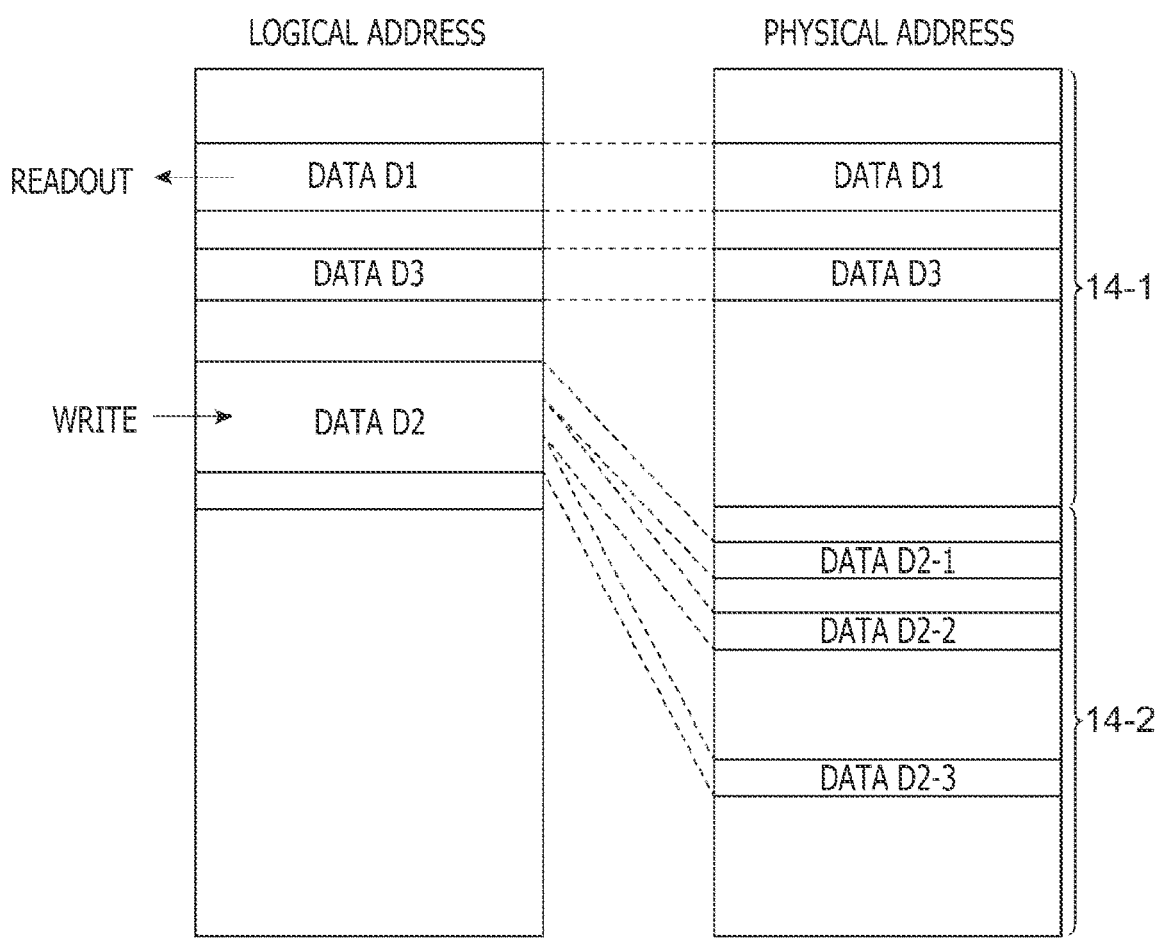
FIG. 3 is a diagram for describing an example of access control executed by a device control circuit.

Specifically, in the case where the access request R2 is a write request, the access control section 22 changes the write destination of data D2, which is the target of the access request R2, to a storage device 14 that is other than the storage device 14-1 storing the data D1. Such control can be achieved by address translation, which maps a logical address specified as a storage destination to a physical address of another storage device 14. FIG. 3 is a diagram for describing such an access destination change. In the example illustrated in this figure, a logical address relatively close to the storage location of the data D1 is specified as the write destination of the data D2. However, the write destination of the data D2 is changed to another storage device 14-2 by address translation. Accordingly, the readout of the data D1 and the write of the data D2 can be executed in parallel, ensuring the latency performance required for the readout of the data D1. It is noted that this address translation may be performed by a paging method or the like.

Figure 4:
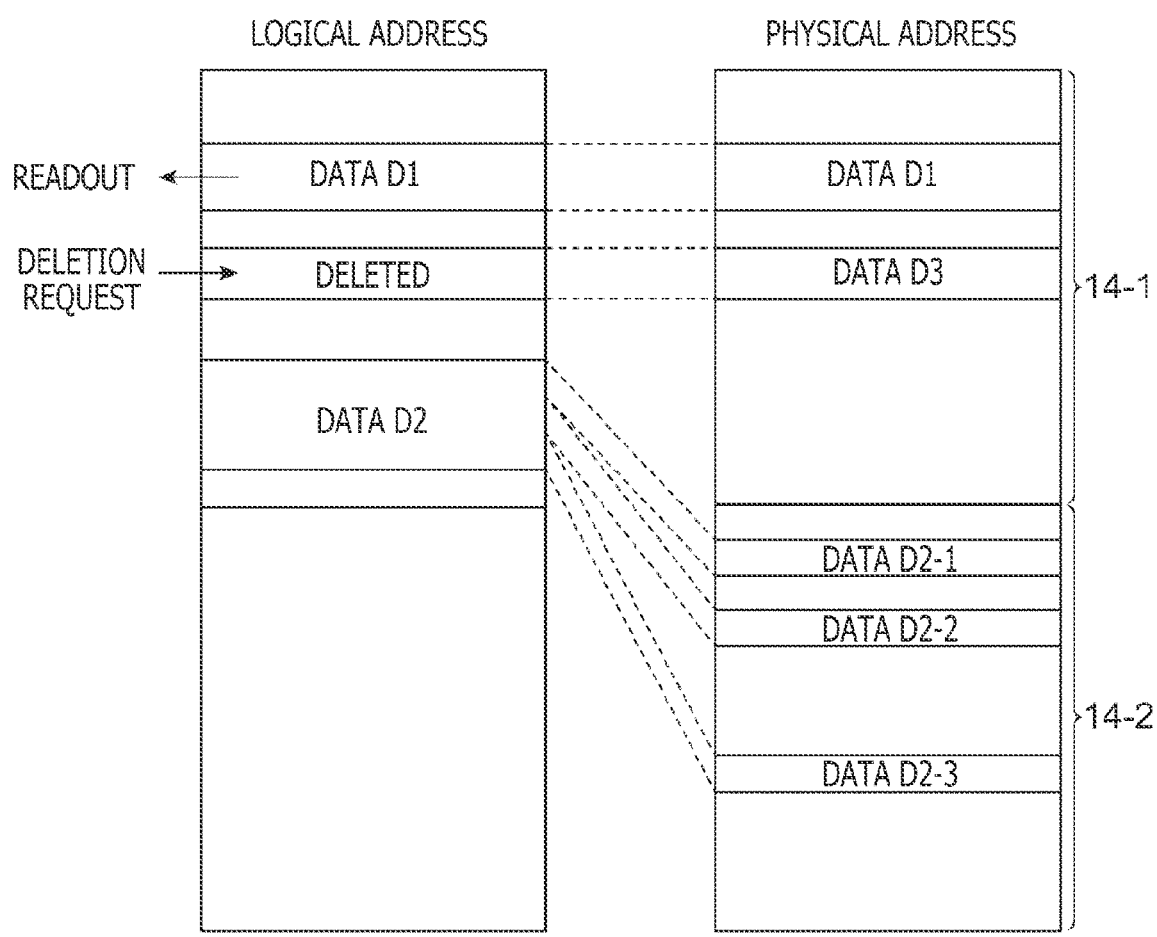
FIG. 4 is a diagram for describing another example of the access control executed by the device control circuit.

Further, in the case where the access request R2 is a request for deleting data D3 stored in the same storage device 14-1 as the data D1, the access control section 22 delays a data D3 deletion process corresponding to this access request R2 until the readout of the data D1 is completed. Specifically, at the timing when the access control section 22 receives a deletion request, the access control section 22 executes control to change the data D3 on the logical address to the deleted status and returns a response to the deletion request that the data D3 has been deleted. However, the access control section 22 does not actually execute the access to the data D3. FIG. 4 illustrates the state in which such a deletion reservation is made. In the case where the access control section 22 receives an access request to the data D3 in this state, the access control section 22 returns a response that the data D3 does not exist. Meanwhile, a process of actually deleting the data D3 in the storage device 14-1 is executed after the readout of the data D1 is completed. Accordingly, a conflict of access to the storage device 14-1 can be avoided.

It is noted that the access control section 22 may execute the data D3 deletion process immediately after the completion of the readout of the data D1 or may execute the data D3 deletion process at a predetermined timing. As a specific example, the access control section 22 may execute the deletion process during a predetermined time period, such as at night, when accesses to the storage devices 14 are expected to be low. Further, in the case where there is a timing at which part of the storage devices 14 becomes out of service, the access control section 22 may execute the deletion process at a timing at which the storage device 14 subject to the deletion process becomes out of service.

Moreover, while reading out the data D1, the access control section 22 also restricts access to the storage device 14-1 except for the access corresponding to the access request. Hereinafter, access to each storage device 14 required for the operation of each storage device 14, which is executed by the access control section 22, except for the access corresponding to the access request will be referred to as management access. Specifically, in the case where a storage device such as a NAND flash memory is used, it is necessary to execute the management access for performing garbage collection, defragmentation, or the like. Further, there is a case of executing the management access for moving data between the storage device 14 and another storage region, such as a cache region, a redundant region, or an over-provisioning region, which differs in readout speed or the like. Further, there is a case of executing the management access for writing or reading out error detection and correction data (error collection code (ECC) data). Further, depending on the memory cell structure of the storage device 14, there is a possibility that the contents retained in memory cells are gradually lost due to the passage of time or external factors, causing data corruption. Therefore, in order to avoid the occurrence of such states, there is a case where the access control section 22 executes the management access to, for example, perform a refresh operation such as recharging/re-writing of the same memory cell value or move a value retained in one memory cell to another memory cell.

Various management accesses exemplified above are also factors that cause delays in other accesses. Therefore, the access control section 22 restricts the execution of the management access while reading out data that is required to be read out with the short delay. After the readout of the data is completed, the access control section 22 executes the management access that has been restricted. As with the deletion process described above, the access control section 22 may execute the management access at a predetermined timing after the completion of the readout access that requires the short delay.

Next, the following describes the control for the case where a write request accompanied by the required performance information is received. In the case where the access control section 22 receives a write request accompanied by the required performance information indicating that readout with the wide bandwidth or the short delay is required, the access control section 22 determines the storage devices 14 to which the data is to be written so as to ensure the performance that is required when the data is read out at a later time.

Specifically, in the case where the write request includes the required performance information that requires readout with a latency (short delay) of a predetermined value or less, the access control section 22 stores the data that is the target of the write request in the storage device 14 allocated for the short-delay readout. Here, the allocation of a use to each storage device 14 is executed by the device allocation control section 23 described later. Conversely, in the case where the received data write request does not include any requirement for latency, the access control section 22 writes the data to the storage device 14 allocated for general access. With this configuration, the data that is required to be read out with the short delay and the data that is not required to be read out with the short delay can be stored in different storage devices 14. This makes it possible to avoid a conflict in access between them.

Further, in the case where the required performance information includes the specification of the bandwidth, the access control section 22 identifies a plurality of storage devices 14 to which the specified data is to be written, and writes the specified data in a distributed manner to the plurality of storage devices 14 that have been identified. With this configuration, when reading out the data at a later time, the access control section 22 can read out the data with the wide bandwidth by reading out the data from the plurality of storage devices 14 in parallel using an interleaving method.

Here, the number of storage devices 14 to which the data is to be written in a distributed manner may be determined according to the size of the required bandwidth. Specifically, as the size of the required bandwidth is larger, the access control section 22 writes the data to a larger number of storage devices 14 in a distributed manner. Here, in the case where each storage device 14 is a NAND flash memory, the storage capacity (the number of bits) per cell is determined according to a storage method called an SLC (single-level cell), an MLC (multi-level cell), or the like. In general, the larger the storage capacity per cell, the worse the data transfer speed and readout delay performance tend to be. The difference in the storage method between the devices generates a difference in the data readout performance. Therefore, the access control section 22 preliminarily retains information regarding the data readout speed of each storage device 14. In the case where the access control section 22 receives a request for writing data that is required to be read out with the wide bandwidth, the access control section 22 determines the number of storage devices 14 for ensuring the required bandwidth, taking into account the data readout speed of each storage device 14.

As a specific example, in the case where the access control section 22 receives a request for writing data that is required to be read out with the wide bandwidth, the access control section 22 uses a predetermined number of storage devices 14 using the SLC method with relatively fast data readout speed as the write destinations and writes the data thereto. For example, in the case where the required bandwidth is 10 GB/s and the data readout speed of the storage devices 14 using the SLC method is 1 GB/s, the access control section 22 writes the data to 10 storage devices 14 in a distributed manner, so that the data can be read out with the required bandwidth.

It is noted that, in the case where the access control section 22 receives a request for writing data that is required to be read out with the short delay and the wide bandwidth, the device allocation control section 23 allocates as many storage devices 14 as necessary for the readout with the required bandwidth for a short-delay readout use, and the access control section 22 writes the data to the plurality of storage devices 14 allocated for this short delay. At this time, as described later, the device allocation control section 23 allocates as many storage devices 14 as necessary for the readout with the required bandwidth for the short-delay readout use. The storage devices 14 allocated for the short-delay readout use are the storage devices 14 capable of ensuring the performance required for the readout delay (e.g., the storage devices 14 that read out and write data using the SLC method). As an example, assume that it is known that the delay required for the readout access control procedure and transfer by the access control section 22 (the delay generated outside the storage device 14) is 150 µs, the readout delay of the storage device 14 using the SLC method is 50 µs, and the readout delay of the storage device 14 using the MLC method is 100 µs. Then, assume that the required performance information requiring the readout delay of 200 µs or less is specified. In this case, the access control section 22 writes the requested data to the storage device 14 using the SLC method. In this way, the required delay performance can be ensured by executing control so as to suppress the conflict in access described above at the time of the readout. In contrast, if the required readout delay is 250 µs or less, the access control section 22 may write the requested data to the storage device 14 using the MLC method. It is noted that the information regarding the readout performance of each storage device 14 exemplified here is retained by the information storage section 24.

Further, the access control section 22 may store the required performance information specified at the time of data write, and when the access control section 22 receives a request for reading out the written data, the access control section 22 may execute the readout control by referring to the stored required performance information. For example, in the case where the access control section 22 receives a request for writing the data D1 with the required performance information requiring readout with the short delay, the access control section 22 stores the data D1 in the storage device 14 allocated for the short-delay readout as described above, and also stores the information indicating that the data D1 is required to be read out with the short delay. Then, when the access control section 22 receives a request for reading out the data D1, the access control section 22 reads out the data D1 with the short delay regardless of whether or not the required performance information is added to the readout request. Specifically, the access control section 22 controls the readout of the data D1 while avoiding a conflict in access in a similar way to the above-described case where a readout request is made with the required performance information requiring readout with the short delay. In this way, by adding the required performance information that specifies the readout performance of the data when writing the data, the access control section 22 can read out the data with the required performance, and the required performance information does not need to be specified each time the data is read out.

It is noted that in the examples described so far, there is a possibility that a plurality of pieces of data requiring readout with the short delay are written to the same storage device 14. In this case, in the case where requests for reading out the plurality of pieces of data written to the same storage device 14 conflict with each other, it is difficult to simultaneously read out both of them with the short delay. To prepare for such a case, in the case where the access control section 22 receives a request for writing data that is required to be read out with the short delay, the access control section 22 may redundantly write the data to the plurality of storage devices 14. With this configuration, in the case where a request for reading out the data conflicts with another readout request, the requested data is read out from some of the storage devices 14 that do not conflict with the other readout request among the plurality of storage devices 14 to which the requested data has been redundantly written. In this way, a readout delay caused by a conflict in access to the single storage device 14 can be avoided.

Specifically, in this example, in the case where the access control section 22 receives a request for writing data that is required to be read out with the short delay, the access control section 22 preliminarily writes the data that is the target of this write request to multiple different storage devices 14 with a multiplicity (the level of plurality) of two or greater.

Under such an assumption, in the case where the access control section 22 is requested to read out certain target data (referred to as data D4 here) with a delay of a predetermined value or less, the access control section 22 guarantees the readout with the short delay by restricting access to the storage device 14 from which the data D4 is being read out, except for the readout of the data D4, while reading out the data D4, as described above. Then, in the case where the access control section 22 simultaneously receives a request for reading out other data (referred to as data D5 here) with the short delay while executing the readout access to the data D4, the access control section 22 checks to see to which storage devices 14 the data D5 has been multiplexed and written. As described above, if data required to be read out with the short delay has been redundantly written, the data D5 should also have been redundantly written to two or more storage devices 14. The access control section 22 reads out the data D5 from a different storage device 14 than the storage device 14 from which the data D4 is being read out (that is, the storage device 14 under access restriction) among the plurality of storage devices 14 to which the data D5 has been written. It is noted that while the data D5 is being read out, the access control section 22 restricts access, except for this access, to the storage device 14 from which the data D5 is being read out, in a similar way to the storage device 14 from which the data D4 is being read out.

For example, in the case where two of the storage devices 14, the storage devices 14-1 and 14-2, are allocated for the short-delay access use, the access control section 22 redundantly writes the data D4 specified to be read out with the short delay to both the storage devices 14-1 and 14-2. Similarly, the access control section 22 also writes the data D5 to both the storage devices 14-1 and 14-2. Then, in the case where the access control section 22 receives a request for reading out the data D5 while reading out the data D4 from the storage device 14-1, the access control section 22 reads out the data D5 from the storage device 14-2. This configuration can ensure that the readout access to the data D4 does not conflict with the readout access to the data D5.

Further, in the case where four of the storage devices 14, the storage devices 14-1 to 14-4, can be used to write the data D4 and the data D5 thereto, the access control section 22 may write each data to two of the storage devices 14, the storage devices 14-1 and 14-2, in a distributed manner and also write the same pieces of data to two of the storage devices 14, the storage devices 14-3 and 14-4, in a distributed manner. In this case, when the access control section 22 receives a request for reading out the data D4, the access control section 22 reads out the data D4 from the two of the storage devices 14, the storage devices 14-1 and 14-2, in a distributed manner. Moreover, in the case where the access control section 22 receives a request for reading out the data D5 while reading out the data D4 in a distributed manner, the access control section 22 reads out the data D5 from the two of the storage devices 14, the storage devices 14-3 and 14-4, in a distributed manner. In this way, as long as each of the plurality of pieces of data is written to the plurality of storage devices 14 in a distributed manner and with a multiplicity of two or greater, the access control section 22 can read out each of the plurality of pieces of data in parallel and in a distributed manner.

In an embodiment of the present invention, the device allocation control section 23 allocates uses to the plurality of storage devices 14 subject to access control. In this case, the device allocation control section 23 allocates some of the plurality of storage devices 14 for the short-delay access use and some of the plurality of the storage devices 14 that are other than the above for a general access use. In the case where the access control section 22 receives a request for writing data, the access control section 22 performs allocation of the storage devices 14 to which the data is to be written according to the result of this allocation. Accordingly, the data required to be accessed with the short delay and the other data can be stored in different storage devices 14. This configuration can ensure that a conflict in access does not occur when the data required to be accessed with the short delay is read out.

It is noted that as in the example of the NAND flash memories described above, there is a case where the readout performance of each storage device 14 is different due to the storage method or the like. In this case, the device allocation control section 23 preferentially allocates the storage devices 14 with the short delay (e.g., the storage devices 14 using the SLC method) for the short-delay access use.

In order to achieve such control, the information storage section 24 preliminarily stores information indicating how much delay occurs when data is read out from each storage device 14. As described above, the readout delay that eventually occurs includes the readout delay caused by the storage device 14 itself and the delay caused by the readout control procedure and data transfer by the access control section 22. Further, the delay required for the readout control procedure and data transfer varies depending on the connection mode and the communication path of each storage device 14 and is not necessarily common to the plurality of storage devices 14. Therefore, the information storage section 24 preliminarily retains not only information regarding the mere readout performance of each storage device 14, but also information regarding the delay caused by such actual access procedure and transfer. Taking into account such information, the device allocation control section 23 may determine the allocation of the storage devices 14 to achieve the required short-delay access.

When the access control section 22 receives a request for writing data that requires short-delay access, the device allocation control section 23 may dynamically execute the allocation of the storage devices 14. In this case, in response to a request from the access control section 22, the device allocation control section 23 first allocates storage devices 14 for the short-delay access. After that, the access control section 22 stores the data that is the target of the write request in the allocated storage devices 14.

Moreover, in this case, when allocating the storage devices 14 for the short-delay access, the device allocation control section 23 may also allocate storage devices 14 for the general access. As described above, when data is read out with the short delay, data of another access request that occurs at the same time is desirably written to a different storage device 14 to avoid a conflict in access. Therefore, when the storage devices 14 for the short-delay access are secured, the storage devices 14 for the general access are also secured. Accordingly, it is possible to make the conflict in access less likely to occur.

It is noted that the number of storage devices 14 for the general access that are secured in this case may be determined according to a predetermined ratio to the number of storage devices 14 for the short-delay access. For example, the storage devices 14 are secured for each use in accordance with such a rule that each time n storage devices 14 for the short-delay access are secured, the number of storage devices 14 for the general access increases by one. Further, as described above, in the case where a request for writing data that is required to be read out with the wide bandwidth and the short delay is received, a relatively large number of storage devices 14 needs to be secured for the short-delay access use. In this case, the required number of storage devices 14 for the required bandwidth may be allocated for the short-delay access use, and the remaining storage devices 14 may be allocated for the general access use.

It is noted that the use allocation executed by the device allocation control section 23 is not fixed and may be changed dynamically. For example, in the case where the free space of the storage devices 14 allocated for the short-delay access is insufficient when a request for writing data that is required to be read out with the short delay is newly received, the storage devices 14 allocated for the general access may be switched to the short-delay access use. Conversely, in the case where the free space of the storage devices 14 allocated for the general access is insufficient when a request for writing data having no performance-related requirement is received, the storage devices 14 allocated for the short-delay access may be switched to the general access use. In such a case, the data is relocated by executing processing such as garbage collection at a timing that a conflict with another access request does not occur. Further, the allocation may be changed by, for example, swapping data between multiple storage devices 14 in order to avoid concentration of access to a specific storage device 14.

Although, in the above description, the required performance information specifies the performance that is required when data is read out, the required performance information may include information specifying the performance that is required when the data is written. As a specific example, the required performance information may include information specifying a bandwidth (the amount of data written per unit time) that is required when the data is written. In the case where the access control section 22 receives a request for writing data accompanied by the required performance information that requires a write with the wide bandwidth, the access control section 22 identifies the storage devices 14 to which the data is to be written, taking into account the required bandwidth and the data write speed of each storage device 14, in a similar way to the case where data required to be read out with the wide bandwidth is written. Then, the access control section 22 writes the data to the identified storage devices 14 in parallel. Accordingly, it is possible to achieve the data write that guarantees the required bandwidth.

As another allocation control method, the device allocation control section 23 may switch the allocation of roles to the plurality of storage devices 14 according to each of the plurality of operation modes. Hereinafter, as a specific example, the device allocation control section 23 switches between three operation modes, i.e., a high-speed readout mode, a high-speed write mode, and a parallel mode, depending on, for example, the type of application program being executed by the arithmetic section 11. The contents of the control for this case will be described with reference to FIG. 5. Here, as a specific example, it is assumed that the information processing apparatus 1 includes five of the storage devices 14, storage devices 14-1 to 14-5.

Specifically, while the arithmetic section 11 is executing a predetermined application program P1, such as a game, the device allocation control section 23 executes allocation suitable for a high-speed readout (a readout with the short delay and the wide bandwidth) (the high-speed readout mode). In this mode, among the plurality of storage devices 14, the storage device 14-1 is allocated for the general access, and the other four storage devices 14-2 to 14-5 are allocated for the high-speed readout. Then, it is assumed that the data used by the application program P1 has been written in a distributed manner to the storage devices 14-2 to 14-5 that have been preliminarily allocated for the high-speed readout. In this example, in the case where the access control section 22 receives a request for reading out data that has been written to the storage devices 14-2 to 14-5, the access control section 22 reads out the data from the four storage devices 14-2 to 14-5 in parallel. Accordingly, the data can be read out with the wide bandwidth.

Moreover, in this high-speed readout mode, in the case where the access control section 22 receives an access request other than the readout request from the application program P1, the access control section 22 restricts access to the storage devices 14-2 to 14-5 and executes control so as not to cause a conflict in access. Specifically, as in the case where the above-described required performance information that requires readout with the short delay is specified, in the case where the access control section 22 receives another write request (e.g., a write request accompanied by the required performance information that specifies a write or readout with best effort), the access control section 22 sets the storage device 14-1, which has been allocated for the general access, as the write destination. It is noted that one example of the write request that does not require such a short delay is, for example, a request for writing save data. The save data records the progress of a game while a game program is being executed. Further, as for the execution of the deletion process corresponding to a request for deleting data or the execution of management access, the execution of the processing thereof is delayed. In this way, it is possible to guarantee that the data used by the specific application program P1 can be read out with the short delay.

In the case where there is a conflict between readout accesses to the storage devices 14-2 to 14-5, the access control section 22 can execute all of these readout accesses with the short delay by executing the following control. Specifically, in this example, it is assumed that each data required to be read out with the short delay has been written in a distributed manner to the storage devices 14-2 to 14-5, which have been allocated for the high-speed readout. The following description takes as an example a case where both of two pieces of data, data A and data B, have been written to the storage devices 14-2 to 14-5 in a distributed manner, and requests for reading out these pieces of data are received sequentially.

In this case, the access request section 21 requests the readout of the data A stored in each of the storage devices 14-2 to 14-5. In response to this request, the access control section 22 sequentially accesses the storage devices 14-2 to 14-5 to read out partial data (referred to as a data fragment here) constituting the data A from each of the storage devices 14-2 to 14-5. After that, assume that the access request section 21 subsequently requests the readout of the data B before the readout of the data A is completed. While continuously reading out the data A, the access control section 22 sequentially accesses the storage devices 14-3 to 14-5 and 14-2 to read out data fragments constituting the data B from the respective storage devices 14.

Here, the access control section 22 reads out each of the data A and the data B in sequence, that is, reads out each of the data A and the data B from a corresponding single storage device 14 at a time. That is, the access control section 22 reads out the data fragment constituting the data A and the data fragment constituting the data B in parallel by targeting different storage devices 14. For example, while reading out the data fragment of the data A stored in the storage device 14-2, the access control section 22 reads out the data fragment of the data B stored in the storage device 14-3 in parallel. According to such control, even though the data A and the data B are stored in the same storage devices 14-2 to 14-5 as a whole, the access control section 22 can read out the data A and the data B in parallel without causing a conflict between the readout of the data A and the readout of the data B. It is noted that the access control section 22 reads out each data in sequence here. However, at a timing that a conflict with another access request does not occur, the access control section 22 may read out, in parallel, the data fragments that have been stored in the plurality of storage devices 14 in a distributed manner.

It is noted that although the description here has been about an example in which a plurality of pieces of data each stored in a distributed manner are read out in parallel in the high-speed readout mode, the embodiment is not limited thereto. As described above, in the case where it is necessary to execute control for avoiding a conflict in access according to the performance requirement information specified by the access request section 21 regardless of the operation mode, if each data to be read out has been preliminarily stored in the plurality of storage devices 14 in a distributed manner, the control described here may also be executed. In this way, it is possible to read out a plurality of pieces of data in parallel while avoiding a conflict in access to the same storage device 14.

In the high-speed write mode, the storage devices 14-2 to 14-5 allocated for the high-speed readout in the high-speed readout mode are allocated for the high-speed write access. This mode is used in a state in which write access is the main access, such as a case where the arithmetic section 11 downloads data of relatively large size, such as a program or content, from an external network via the communication section 15. In this mode, the access control section 22 writes data that is required to be written at a high speed to the storage devices 14-2 to 14-5 in a distributed manner. In this way, it is possible to write the data with the wide bandwidth.

In this mode, in the case where the access control section 22 receives a request for writing data that is not the target of the high-speed write (e.g., a write request accompanied by the required performance information that specifies a write or readout with best effort), the access control section 22 writes the data to the storage device 14-1 allocated for the general access. Accordingly, the access control section 22 can write the data that is required to be written at a high speed to the storage devices 14-2 to 14-5 with the wide bandwidth without causing a conflict in access. It is noted that as for data whose request source is a predetermined program, such as a download program, the access request section 21 issues a write request together with the required performance information indicating that the data is the target of the high-speed write.

The parallel mode is a mode in which both the high-speed readout and the high-speed write are executed. This mode is used in the case of the execution of an application program P2, which executes both the readout and write at the same time, for example, in the case where a game or the like is executed while the video thereof is recorded. In this parallel mode, while the general access is allocated to the storage device 14-1 as with the other modes, the high-speed readout is allocated to the storage devices 14-2 and 14-3 and the high-speed write is allocated to the storage devices 14-4 and 14-5. Accordingly, data that is required to be read out at a high speed is read out from the two storage devices 14-2 and 14-3 in parallel, and data that is required to be written at a high speed is written to the two storage devices 14-4 and 14-5 in parallel. Accordingly, the high-speed readout and the high-speed write can be executed in parallel at the same time. In this example, the data to be written at a high speed is, for example, game recording data or the like that needs to be recorded in real time without frame dropping. It is noted that as with the other modes, as for a request for accessing data that is not required to be read out or written at a high speed (e.g., a write request accompanied by the required performance information that specifies a write or readout with best effort), the execution is made targeting the storage device 14-1 allocated for the general access. As a specific example, mere video recording data that does not require real-time performance may be written to the storage device 14-1 as the general access. According to such control, it is possible to avoid a conflict in access among the general access, the high-speed readout, and the high-speed write.

In order to achieve such control, the data to be read out at a high speed in the parallel mode (that is, the data to be read out by the application program P2 assuming the use of the parallel mode) is preliminarily stored in the storage devices 14-2 and 14-3 allocated for the high-speed readout in the parallel mode. It is noted that although the number of storage devices 14 allocated for the high-speed readout is the same as the number of storage devices 14 allocated for the high-speed write here, the number of storage devices 14 allocated for each use may be determined according to the required readout and write bandwidth and the data transfer speed of each storage device 14.

As described above, in the example of FIG. 5, the use allocated to each storage device 14 is switched according to the operation mode. Accordingly, the readout or write performance required in each situation can be ensured. However, part of the plurality of storage devices 14 (the storage device 14-1 here) is allocated for the general access use in every operation mode. With this configuration, it is possible to execute control so as to always write data that does not have a performance-related requirement to the storage device 14 allocated for the general access, no matter at what timing a write request is received. Accordingly, it is possible to ensure that in any operation mode, the access to data that is required to be read out or written at a high speed is not interrupted by the access to data that does not have a performance-related requirement.

Moreover, in this example, access for deleting data or management access such as garbage collection to the storage devices 14-2 to 14-5 allocated for the high-speed readout and high-speed write uses may be restricted while the high-speed readout or the high-speed write is being executed. The access control section 22 may execute such an access that does not have a performance-related requirement at a timing when it is expected that a high-speed readout or high-speed write access request is not generated, for example, during a specific time period such as at night or when the arithmetic section 11 is not executing a specific application program.

In order to achieve the control described so far, the access control section 22 may execute management access to move data among the plurality of storage devices 14 as needed. For example, data that is required to be written at a high speed needs to be written to any storage device 14 capable of satisfying the specified requirement, such as a storage device 14 in the SLC format. However, depending on the required readout performance specified for such data, there is a case where the required performance can be ensured even if the data is read out from a different storage device 14 (e.g., a storage device 14 in the MLC format) at the time of the readout. In such a case, it is desirable to secure the free space of the high-performance storage device 14 in preparation for a future request requiring a high-speed write or a higher-level high-speed readout. Therefore, the access control section 22 may execute management access to move the data that has once been written with the required performance to a different storage device 14. This kind of management access makes it possible to flexibly respond to various access performance requirements that may arise in the future.

Further, in the case where there is a timing at which part of the plurality of storage devices 14 becomes out of service, the access control section 22 may execute a data deletion process or various management accesses to the storage device 14 that becomes out of service at that timing. In a server computer or the like, there is a case where the access control section 22 executes control to cause the storage devices 14 to become out of service in a domain or drive unit. If the data deletion process, management access, or the like that has been delayed is executed at such a timing, a conflict in access can be further less likely to occur.

Further, in the case where the access control section 22 receives a write request that requires a high-speed write or the like, the access control section 22 may temporarily write data to a volatile memory that can be used as a cache. In this case, the access control section 22 executes management access to move the data written to the volatile memory to a corresponding storage device 14 at a later time during a time period when no access conflict is expected to occur. Further, in the case where the access control section 22 receives a readout request, the access control section 22 may transfer the requested data to the access request section 21 while temporarily writing the same data to the volatile memory used as the cache. In this case, in the case where the access control section 22 receives a request for reading out the same data at a later time, the access control section 22 reads out the data written to the volatile memory. In this case, in the case where, for example, the free space of the volatile memory used as the cache is insufficient or no access has been made to the data written to the volatile memory for a certain period of time, the written data is deleted.

As described above, while reading out data with the short delay, the access control section 22 restricts a write to the storage device 14 from which the data is being read out in order to avoid a conflict in access. Therefore, while the data is being read out with the short delay in this way, the free space of the storage device 14 from which the data is being read out may be excluded from the count of the writable capacity. According to such control, while the data is being read out with the short delay, the access request section 21 recognizes as if the writable free space of the entire plurality of storage devices 14 decreased by the free space under write restriction at that timing.

It is noted that in the case where the above-described storage region that can be used as the cache or another storage device for writing redundant data thereto is secured and thus there is a storage capacity available that can accept write access even during data readout with the short delay, the storage capacity may be counted as a writable free space. The presentation of such a free space may be performed via a file system.

In the description so far, the access request section 21 gives notification of the performance requirement information to specify the performance required for access. However, the embodiment is not limited thereto. The required performance may be preliminarily associated with a range (address range) in an address space that identifies the access destination, and the access request section 21 may specify the performance required for access by specifying the address range. This eliminates the need for the access request section 21 to add the performance requirement information to an access request each time. In this case, the access control section 22 preliminarily sets a plurality of address ranges within the address space for specifying the access destination among the plurality of storage devices 14. Then, the access control section 22 preliminarily stores, in association with each of the plurality of address ranges, the required performance that needs to be achieved. Moreover, the access control section 22 preliminarily notifies the access request section 21 of a correspondence relation between the set address ranges and the required performances.

When the access request section 21 issues an access request, the access request section 21 specifies, as the access destination, the address range selected according to the performance required for the target data of this access among the plurality of address ranges and issues the access request. The access control section 22 that receives the access request executes access corresponding to the access request using various methods described so far so as to satisfy the required performance associated with the address range specified by the access request. This enables access control that satisfies the required performance without the access request section 21 having to give notification of the performance requirement information each time.

Figure 6:
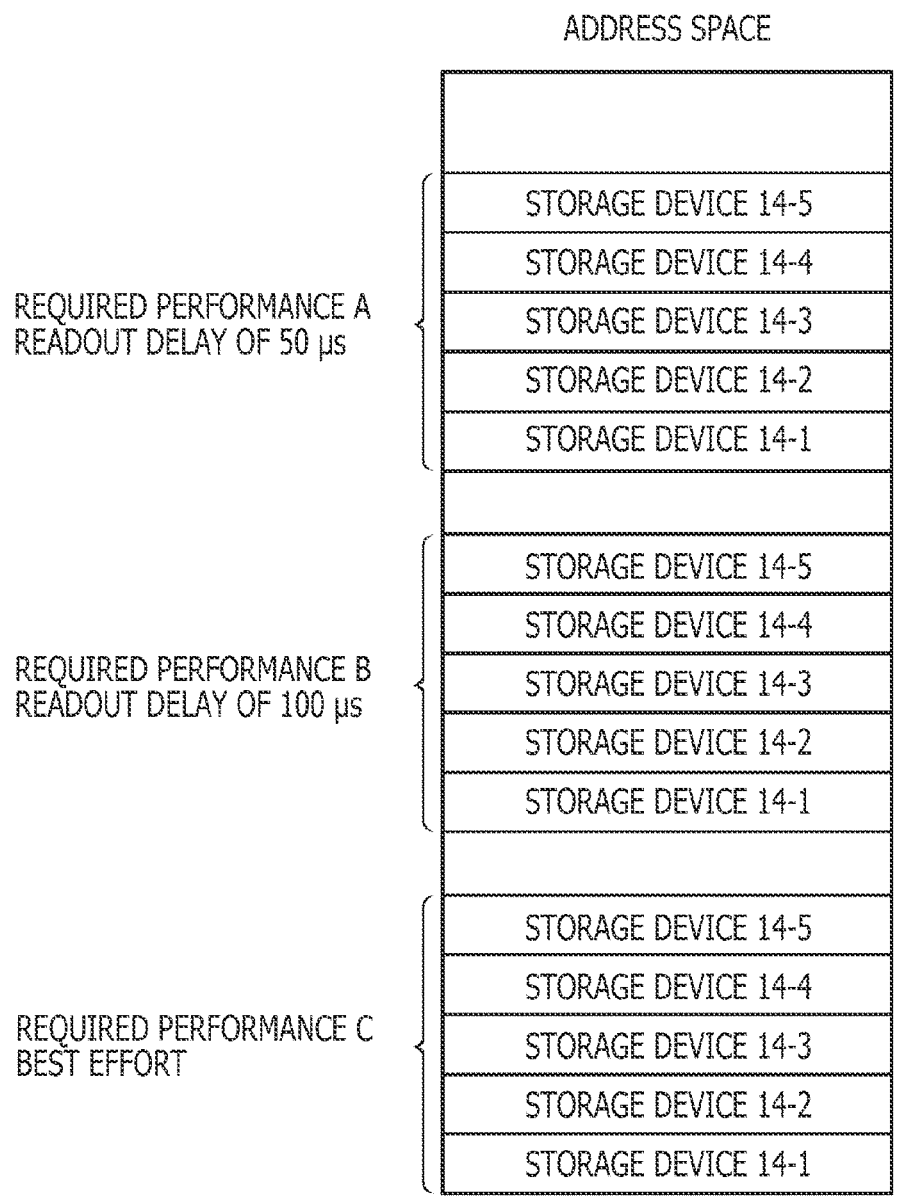
FIG. 6 is a diagram illustrating an example of performance allocation to an address space.

FIG. 6 is a diagram illustrating an example of the performance allocation to the address space. In the example in this figure, the identical storage devices 14 are multiply allocated to the address space using a segment method. Specifically, in this figure, the high-order address bits (segment address) specify one of the three types of required performance (that is, required performance A, B, or C). Further, the low-order address bits (offset address) specify which storage device 14 is to be used and the access location inside the corresponding storage device 14. By the combination of the high-order address bits and the low-order address bits, the access request section 21 can specify the required performance as well as the storage device 14 to be accessed and the access location.

Figure 7:
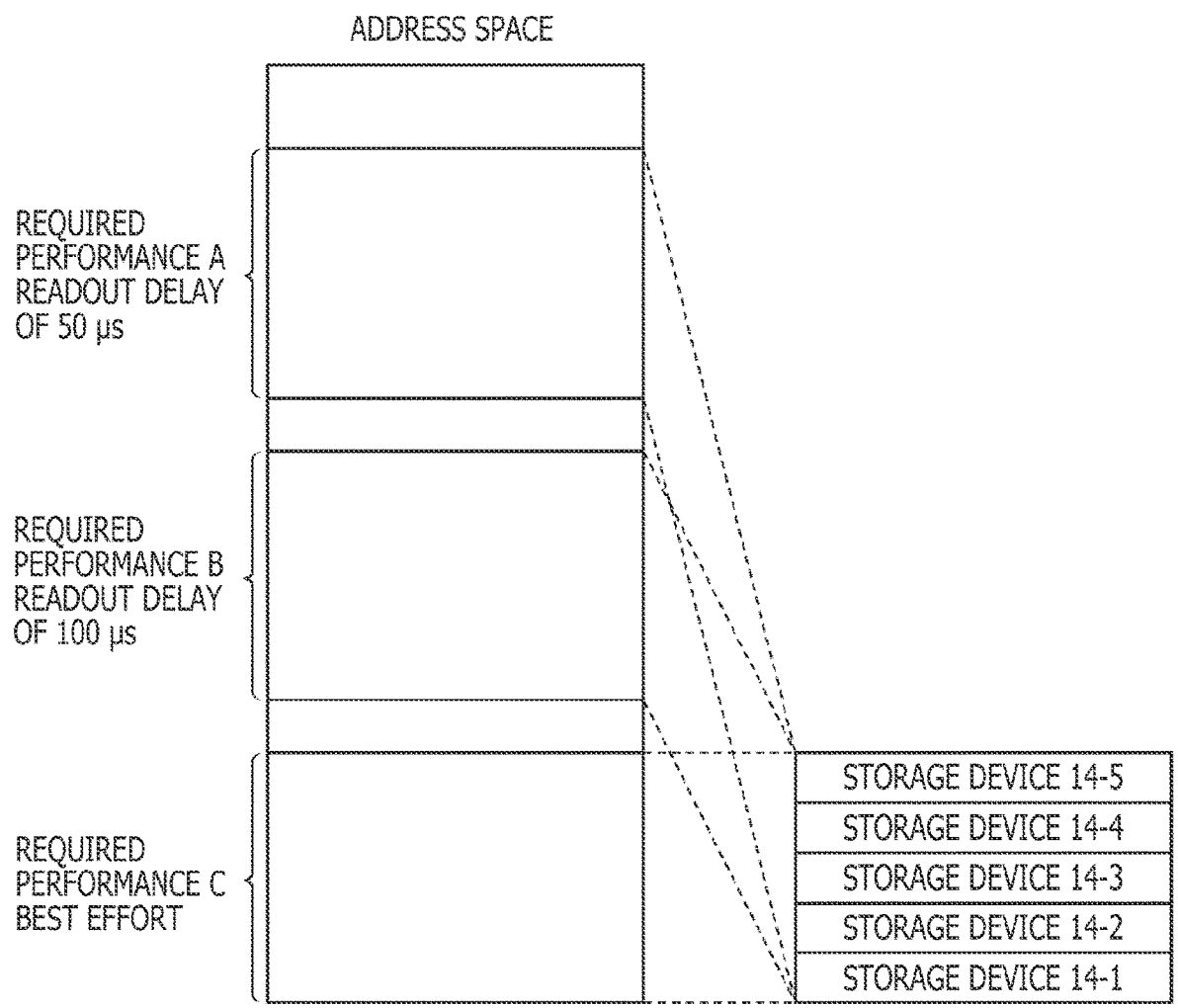
FIG. 7 is a diagram illustrating another example of the performance allocation to the address space.

FIG. 7 is a diagram illustrating another example of the performance allocation to the address space. In the example in this figure, the identical storage devices 14 are multiply allocated to the address space using a paging method. In this figure as well, the high-order address bits (page address) specify one of the three types of required performance (that is, the required performance A, B, or C). Further, the low-order address bits (offset address) specify which storage device 14 is to be used and the access location inside the corresponding storage device 14.

The information processing apparatus 1 according to the present embodiment described above changes the write or readout control contents according to the performance such as a delay or a bandwidth required for the data to be accessed, so that the performance required at the time of readout or write can be guaranteed.

The embodiment of the present invention is not limited to the embodiment described above. For example, in the above description, the access control section 22 receives an access request to the storage devices 14 from the access request section 21, which is implemented by the arithmetic section 11 executing the programs stored in the main memory 12. However, the embodiment is not limited thereto. The access control section 22 may receive an access request issued by another data transfer entity on the basis of a remote DMA (Direct Memory Access) architecture or the like and execute access corresponding to the request. In this case, as with the access request received from the access request section 21, the access control section 22 receives an access request including the required performance information from another data transfer entity and executes access control based on the control contents corresponding to the request.

Further, at least part of the processing executed by the device control circuit 13 in the above description may be implemented as software by the arithmetic section 11 executing the programs such as the operating system. Specifically, the arithmetic section 11 itself may determine, for example, the allocation of roles to each storage device 14 according to the type of application program currently being executed and notify the device control circuit 13 of the determination contents. In this case, according to the notified determination contents, the device control circuit 13 determines the storage devices 14 to which the requested data is to be written when a write request is received.

Further, although the plurality of storage devices 14 are NAND flash memories physically independent of each other in the above description, the embodiment is not limited thereto. The storage devices 14 may include various types of non-volatile memories such as a magnetoresistive random access memory (MRAM), a ferroelectric random access memory (FeRAM), an FRAM (registered trademark), a phase-change memory (PCM), an Xpoint, a resistive random access memory (ReRAM), and RRAM (registered trademark) and various types of devices such as a solid-state drive (SSD). Further, the information processing apparatus 1 according to the present embodiment may also use a volatile memory as at least part of the plurality of storage devices 14. In this case, the volatile memory can be used as the storage device 14 that satisfies the wide bandwidth and short delay performance requirements. Further, the storage devices 14 may be a plurality of printed circuit boards or semiconductor packages built into a single device. Further, the storage devices 14 may be a plurality of semiconductor packages mounted on a single printed circuit board. Alternatively, the plurality of storage devices 14 may be a plurality of silicon dies enclosed in a single semiconductor package. Further, the storage devices 14 may be a plurality of layers, banks, planes, or the like which are integrated into a three-dimensional multilayer within a single silicon die and to which storage element groups are individually divided and allocated. Further, the storage devices 14 may be a plurality of banks, planes, or the like which are integrated into a two-dimensional monolayer within a single silicon die and to which storage element groups are individually divided and allocated. Moreover, the information processing apparatus 1 according to the present embodiment may execute the above-described control targeting the plurality of storage devices 14 including a mix of elements and devices of different granularity as exemplified above. The plurality of storage devices 14 may differ from each other in performance, such as delay, and access paths. In particular, each of the plurality of storage devices 14 may have an access path individually prepared for the corresponding storage device 14, thereby avoiding a conflict of access processes with the other storage devices 14. In any case, the information processing apparatus 1 according to the present embodiment controls access to each storage device 14 as described above by using a plurality of storage regions to which different types of accesses can be executed in parallel as the plurality of storage devices 14.

Further, the embodiment of the present invention can be implemented in various modes. FIG. 8 illustrates an example of a hardware configuration of a game console (such as a home game machine), which is an embodiment of the present invention. This game console includes a main system on a chip (SOC), which functions as the arithmetic section 11, a NAND flash controller, which functions as the device control circuit 13, and a plurality of NAND flash memories (each abbreviated as NAND flash in the figure), which function as the storage devices 14. The main SOC may have a built-in DMA engine and Crypt engine. The DMA engine supports remote DMA, which directly transfers data between a main memory and the NAND flash controller without the management of the operating system. The remote DMA can reduce delay in accessing the NAND flash memories compared to the case where the CPU executing the operating system issues an access request. The Crypt engine may encrypt data written to the NAND flash memories and decrypt the data that has been read out. Further, an error detection and correction circuit in the NAND flash controller detects and corrects memory cell data corruption in the NAND flash memories. Access for this error detection and correction is also included in the above-described management access.

The game console may execute management access to the storage devices 14, such as the above-described garbage collection, or download or install data of a new game application during a time period (out of service time) when the user is not executing a game. The access control section 22 and the device allocation control section 23, which are implemented by the NAND flash controller, and the operating system executed by the arithmetic section 11 execute the scheduling of such processing in cooperation. Accordingly, it is possible to suppress the parallelism of the storage devices 14 required to satisfy the performance requirements of data access.

Figure 9:
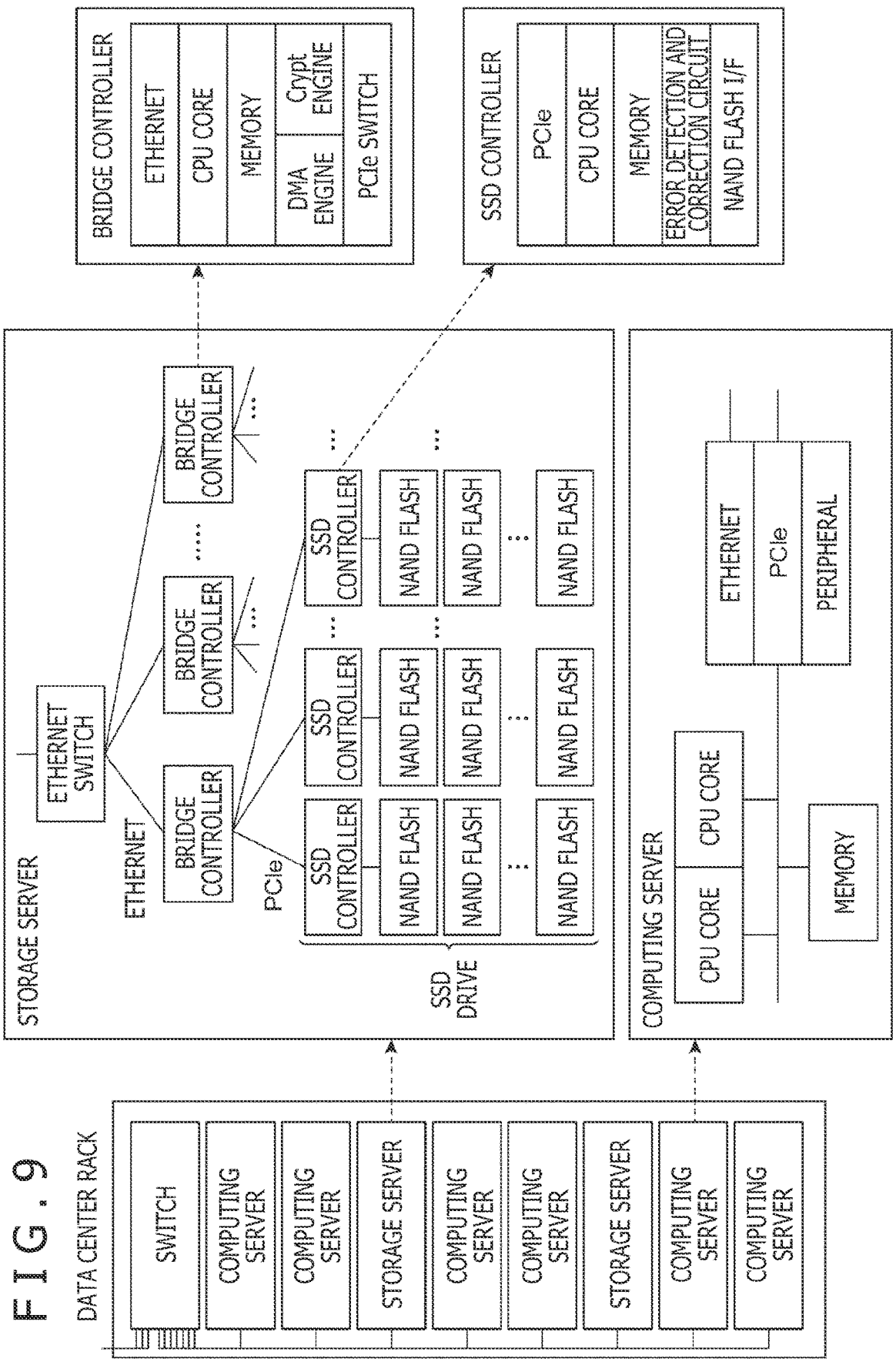
FIG. 9 is a diagram illustrating an example of a configuration for the case where an embodiment of the present invention is applied to a server system.

Further, although the arithmetic section 11, which issues an access request, and the device control circuit 13, which receives the access request and controls access to the plurality of storage devices 14, are present in the same housing in the above description, both the arithmetic section 11 and the device control circuit 13 may be information processing apparatuses independent of each other. FIG. 9 illustrates an example of such an embodiment. In this figure, a configuration of a server system including a plurality of computing servers and a plurality of storage servers mounted in a data center rack is illustrated. These groups of servers are connected to each other via a switch. It is noted that although each server is connected via Ethernet (registered trademark) here, the embodiment is not limited thereto. Each server may be connected via various interfaces such as Fibre Channel, InfiniBand, and a peripheral component interconnect express (PCIe). Further, the physical layer of the connection path between the servers may employ various means such as the common internal electrical interface (CEI) standard and an optical fiber.

Each storage server is shared by the plurality of computing servers and simultaneously processes a large number of access requests received from each of the plurality of computing servers. Each storage server includes one or more bridge controllers, and a plurality of SSD drives are connected to the respective bridge controllers. Each SSD drive includes an SSD controller and a plurality of NAND flash memories connected to the SSD controller. These NAND flash memories function as the storage devices 14 according to the present embodiment. This configuration can extremely increase the parallelism of the storage devices 14 connected to each storage server (e.g., several hundred to several thousand). With this configuration, even if access requests requiring the short delay and the wide bandwidth are simultaneously generated from the plurality of computing servers, the access control section 22 and the device allocation control section 23, which are implemented by the storage server, can properly process access corresponding to each request.

For example, this server system may be used to provide a cloud gaming service to users of client machines. As a specific example, each computing server executes a different game application, encodes a rendered image, and transmits the rendered image to the client machines over a network. The data of these game applications is huge. For example, the data may exceed 100 GB per game. Each storage server retains data of a large number of game applications. Each computing server loads and executes data of a corresponding game application in response to a request from the user of the client machine. The data of each game application may retain the required performance information regarding the performance required for access to the data. For example, as for the data of a game application that is required to be read out with a required bandwidth of 10 GB/s and an allowable delay of 0.2 μs, the required performance information indicating the required performance is added to this data. Each computing server may refer to the required performance information when downloading or installing (that is, writing) the data of each game application to the storage devices of the corresponding storage server.

In this example, the quantity of storage devices included in each storage server may be redundant. Accordingly, even while the computing server and the storage server are running, access such as execution of management access such as garbage collection, downloading and installing of data of a new game application, and making part of the storage devices out of service for routine maintenance can be executed by allocating the storage devices having redundancy.

Each of the computing servers and the storage servers may have a built-in DMA engine and Crypt engine. The DMA engine supports remote DMA, which transfers data between the computing server and the storage server without the management of the operating system. Supporting the remote DMA can reduce delay in accessing the storage devices 14 compared to the case where an access request is processed via the CPU. The Crypt engine may encrypt and decrypt the data written to the storage devices 14.

Figure 10:
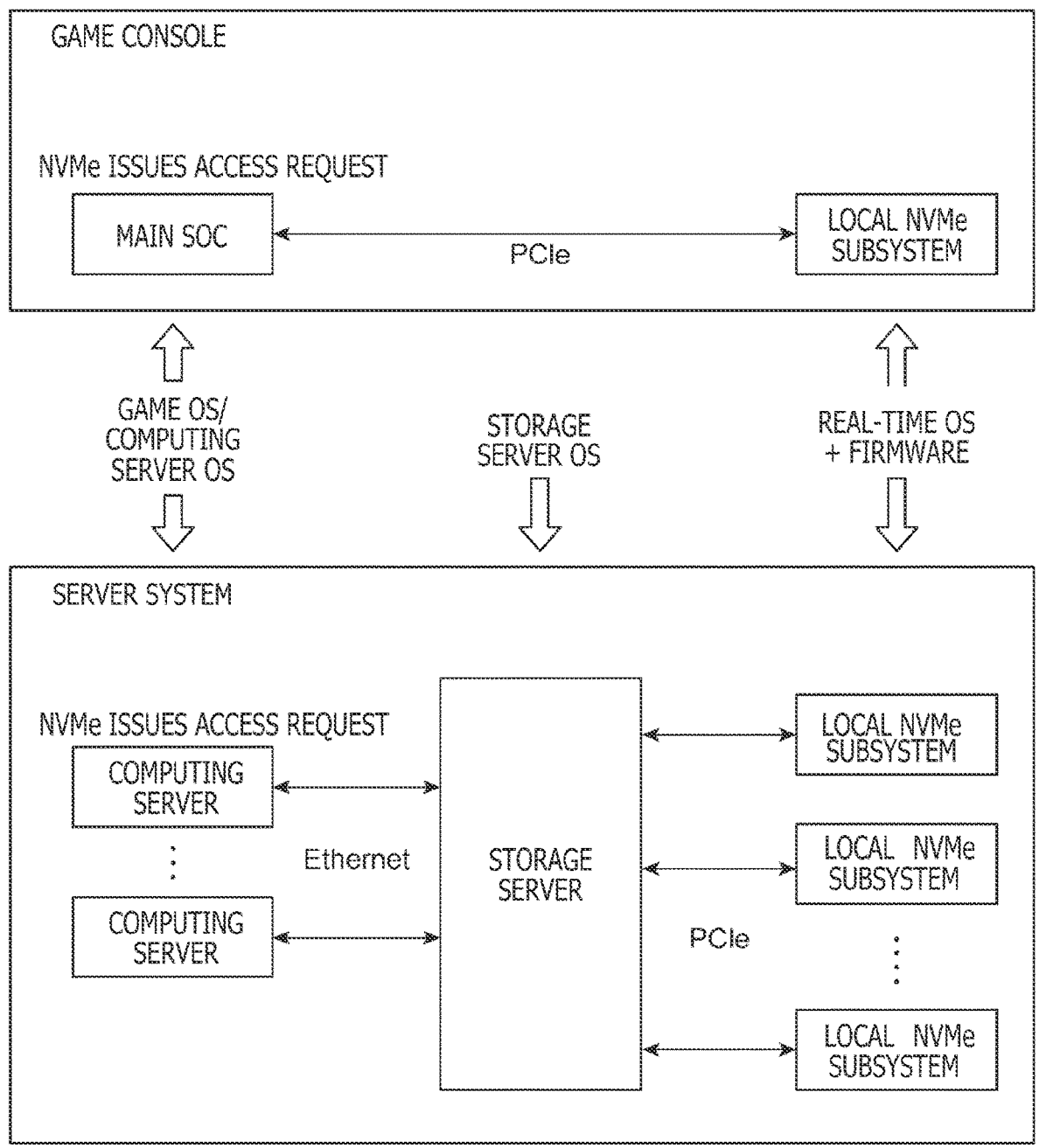
FIG. 10 is a diagram illustrating an overview of a software hierarchy configuration.
Figure 11:
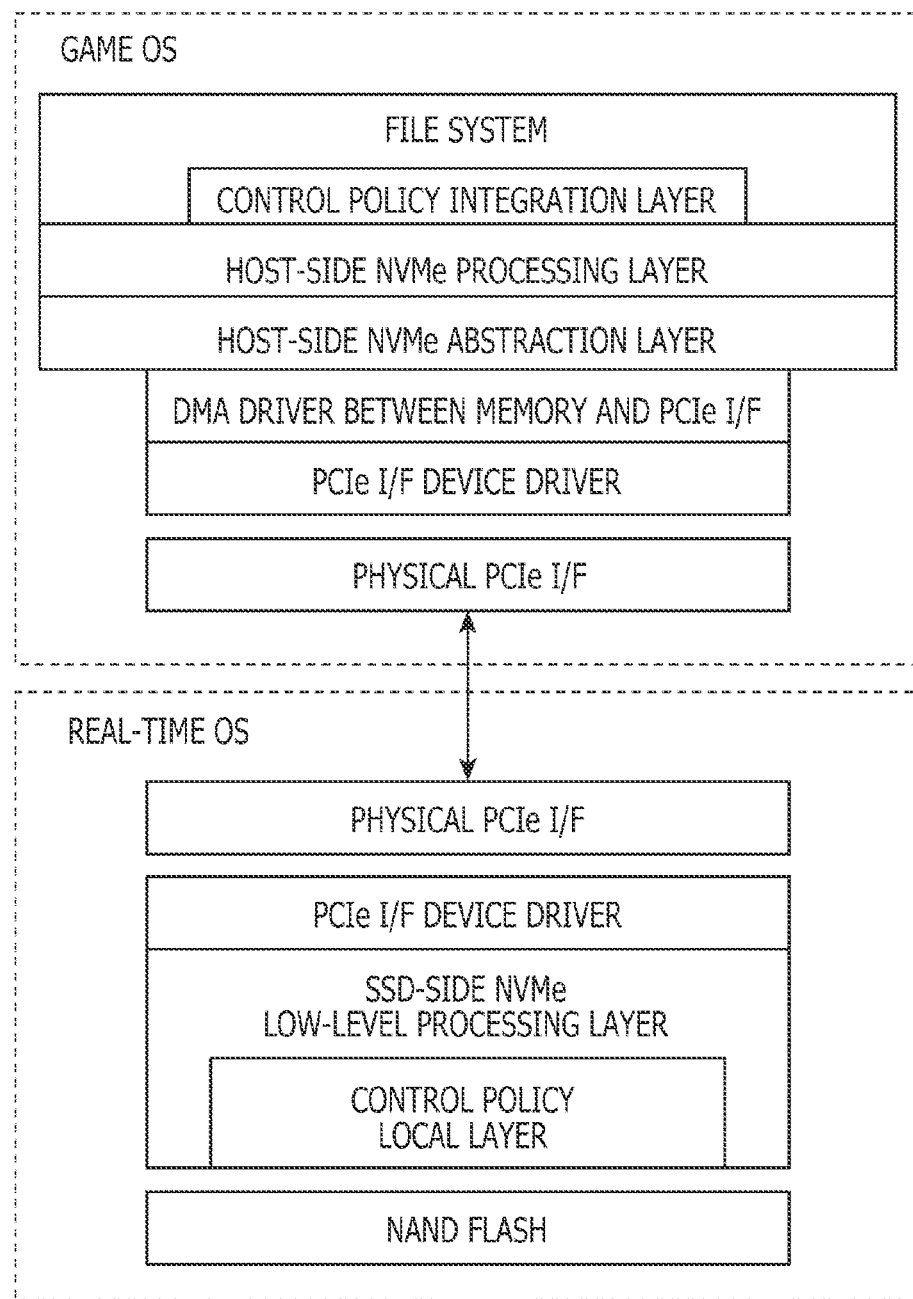
FIG. 11 is a diagram illustrating a software hierarchy configuration of the game console.

FIGS. 10 to 12 are diagrams each illustrating a software hierarchy configuration of the game console and the server system described here. FIG. 10 illustrates a correspondence relation between the two. FIG. 11 illustrates an example of a software configuration of the game console. FIG. 12 illustrates an example of a software configuration of the server system. As illustrated in FIG. 10, each of the operating system (game operating system (OS)) executed by the main SOC in the game console and a server OS executed by the computing server in the server system functions as the issuance source of an access request (that is, the access request section 21 in the description so far). The access request is processed by a local non-volatile memory express (NVMe) subsystem executing a real-time OS. This local NVMe subsystem corresponds to the NAND flash controller in the case of the game console and corresponds to each SSD controller in the case of the server system.

As illustrated in these figures, the game OS and the computing server OS request access to the storage devices 14 using an NVMe (NVM Express) interface through the file system. Here, an NVMe abstraction layer is a layer that has a function of a generally-called HAL (Hardware Abstract Layer), which abstracts a lower-level physical interface for a processing layer that operates on an NVMe standard at a higher level. Device drivers corresponding to various network interfaces are connected below this abstraction layer. A DMA driver implements a user-level DMA. Specifically, the DMA driver and a main memory management layer of the operating system, not illustrated, operate in cooperation to implement the user-level DMA.

In these figures, the functions of the access control section 22 and the device allocation control section 23 described so far are implemented by a control policy local layer on the real-time OS side. A control policy integration layer on the game OS side implements the functions for cooperating with these functions on the access request side. However, at least part of the functions executed by the control policy local layer here may also be executed by the control policy integration layer. This control policy integration layer may operate integrally with the file system of the game OS. It is noted that although not illustrated in FIG. 12, a storage server OS that relays the connection between the computing server OS and the real-time OS may also have the functions of the control policy local layer.

An SSD-side NVMe low-level processing layer executes, for example, management access, address translation, and detection and correction of memory cell data corruption. The SSD-side NVMe low-level processing layer also executes management of the over-provisioning region in cooperation with the access control section 22 and the device allocation control section 23.

It is noted that in the computing server OS, an abstraction layer compliant with an NVMe-oF (NVMe over Fabrics) standard may be implemented in place of the NVMe abstraction layer. In this case, the computing server OS issues an access request compliant with NVMe-oF, and the storage server OS mediates and dispatches this access request, transmitting the access request to the SSD controller. The real-time OS/firmware of the SSD controller receives this access request and executes low-level control over the NAND flash memories. At this time, by interposing the abstraction layer, the processing layer at a higher level can issue an access request without taking into account, for example, what a logical device interface at a lower level is or whether the storage is connected either locally or remotely.

REFERENCE SIGNS LIST

1: Information processing apparatus
11: Arithmetic section
12: Main memory

13: Device control circuit
14: Storage device
21: Access request section
22: Access control section
23: Device allocation control section
24: Information storage section

The invention claimed is:

1. An information processing apparatus for controlling access to a plurality of storage devices, the information processing apparatus comprising:
a reception section configured to receive an access request to the plurality of storage devices; and
an access control section configured to execute access to one of the plurality of storage devices in response to the received access request,
wherein the access control section changes a mode of the access according to performance required for readout of target data that is a target of the access request, and
the required performance includes at least a performance regarding a length of a readout delay time for the target data.

2. The information processing apparatus according to claim 1,
wherein the access request includes required performance information specifying a requirement for the length of the readout delay time for the target data, and
the access control section changes the mode of the access according to the required performance information.

3. The information processing apparatus according to claim 2, wherein the required performance information is information that is added to the access request and transmitted and is information regarding a performance required for at least one of access corresponding to the access request or access for reading out, at a later time, data that is a target of the access request.

4. The information processing apparatus according to claim 3, wherein the required performance information includes information regarding a length of a readout delay time required for readout of each of a plurality of pieces of data that are targets of the access request.

5. The information processing apparatus according to claim 2, wherein the required performance information includes, in addition to information specifying the requirement for the length of the readout delay time, at least one of information specifying a requirement for a readout speed and information specifying readout with best effort.

6. The information processing apparatus according to claim 2, wherein
the access request is a request for writing the target data, and
the access control section changes a storage device to which the target data is to be written according to the required performance information.

7. The information processing apparatus according to claim 6, wherein, in a case where the required performance information includes required performance information that requires the target data to be read out with a delay time of a predetermined value or less, the access control section writes the target data to a storage device allocated for readout with the delay time of the predetermined value or less among the plurality of storage devices, while in a case where the access control section receives a request for writing data that is not required to be read out with the delay time of the predetermined value or less, the access control section writes the data to a different storage device other than the storage device allocated for the readout with the delay time of the predetermined value or less.

8. The information processing apparatus according to claim 6, wherein
the required performance information includes required performance information regarding a bandwidth required for the readout of the target data, and
the access control section writes the target data, in a distributed manner, to a plurality of the storage devices identified according to the bandwidth.

9. The information processing apparatus according to claim 1, wherein, in a case where the target data is required to be read out with a delay time of a predetermined value or less, the access control section restricts, while reading out the target data, access to a storage device storing the target data, except for the readout of the target data.

10. The information processing apparatus according to claim 9, wherein, in a case where the access control section receives a request for writing other data while reading out the target data, the access control section changes a write destination of the other data to a different storage device than the storage device storing the target data.

11. The information processing apparatus according to claim 10, wherein the access control section changes the write destination of the other data to the different storage device by translating an address of the write destination specified in the request for writing the other data to a different address.

12. The information processing apparatus according to claim 11, wherein the access control section translates the address of the write destination to the different address by performing address translation based on a paging method.

13. The information processing apparatus according to claim 10, wherein, in a case where the access control section restricts write access to the storage device storing the target data while reading out the target data, the access control section excludes a free space of the storage device storing the target data from a count of a free space of the entire plurality of storage devices during restriction of the write access.

14. The information processing apparatus according to claim 13, wherein, in a case where the access control section restricts the write access to the storage device storing the target data while reading out the target data, and in a case where the access control section retains a storage region for temporarily storing other data that is supposed to be written to the storage device storing the target data, the access control section counts the free space of the entire plurality of storage devices by adding a free space of the storage region to the free space of the entire plurality of storage devices.

15. The information processing apparatus according to claim 9, wherein, in a case where the access control section receives a request for deleting other data stored in the storage device storing the target data while reading out the target data, the access control section restricts execution of a process of deleting the other data and, after the readout of the target data is completed, executes the process of deleting the other data.

16. The information processing apparatus according to claim 15, wherein the access control section executes the process of deleting the other data at a predetermined timing after the readout of the target data is completed.

17. The information processing apparatus according to claim 15, wherein, in a case where the access control section receives the request for deleting the other data, the access control section returns, before executing the process of deleting the other data, a response that indicates that the other data has already been deleted, to the request for deleting the other data.

18. The information processing apparatus according to claim 9, wherein the access control section restricts execution of management access that is required for operation of the storage device storing the target data to the storage device while reading out the target data and, after the readout of the target data is completed, executes the management access.

19. The information processing apparatus according to claim 18, wherein the access control section executes the management access at a predetermined timing after the readout of the target data is completed.

20. The information processing apparatus according to claim 9, wherein the access control section redundantly writes data to the plurality of storage devices, and in a case where the access control section receives a request for reading out other data while reading out the target data, the access control section reads out the other data from a storage device that is different than the storage device storing the target data and to which the other data has been redundantly written.

21. The information processing apparatus according to claim 9, wherein the access control section writes data, in a distributed manner, to the plurality of storage devices, and in a case where the access control section receives a request for reading out other data while reading out the target data, the access control section executes, in parallel, a process of reading out a portion constituting the target data from any storage device among the plurality of storage devices and a process of reading out a portion constituting the other data from a different storage device among the plurality of storage devices.

22. The information processing apparatus according to claim 1,
wherein the access request is a request for writing the target data and includes required performance information regarding a bandwidth performance required when the target data is written, and
the access control section writes the target data, in a distributed manner, to a plurality of the storage devices identified according to the bandwidth performance.

23. The information processing apparatus according to claim 1,
wherein the information processing apparatus operates in one of a plurality of operation modes and further includes a device allocation control section configured to switch a use allocated to each of the plurality of storage devices according to the plurality of operation modes,
the access request is a request for writing the target data, and
the access control section determines a write destination of the target data according to the allocated use.

24. The information processing apparatus according to claim 1, wherein
an address space used for specifying an access destination of the access request includes a plurality of address ranges, and a required performance to be achieved is preliminarily associated with each of the plurality of address ranges,
a request source of the access request specifies an address range selected according to a performance required for the access request among the plurality of address ranges and makes the access request, and
the access control section executes access corresponding to the access request so as to satisfy the required performance associated with the address range specified in the access request.

25. An information processing method for controlling access to a plurality of storage devices, the information processing method comprising:
receiving an access request to the plurality of storage devices; and
executing access to one of the plurality of storage devices in response to the received access request,
wherein the executing changes a mode of the access according to a performance required for readout of target data that is a target of the access request, and
the required performance includes at least a performance regarding a length of a readout delay time for the target data.

26. A non-transitory, computer readable storage medium containing a program, which when executed by a computer for controlling access to a plurality of storage devices, to perform an information processing method for controlling access to the plurality of storage devices by carrying out actions, comprising:
receiving an access request to the plurality of storage devices; and
executing access to one of the plurality of storage devices in response to the received access request,
wherein the executing changes a mode of the access according to a performance required for readout of target data that is a target of the access request, and
the required performance includes at least a performance regarding a length of a readout delay time for the target data.

* * * * *